(12) United States Patent
Costello et al.

(10) Patent No.: US 8,403,308 B2
(45) Date of Patent: Mar. 26, 2013

(54) TAILGATE STABILIZER

(75) Inventors: Philip G. Costello, North Haven, CT (US); Jason M. Sicotte, Bristol, CT (US); Lauren Akey, Redford, MI (US); Raymond C. Brunet, Bristol, CT (US)

(73) Assignee: Barnes Group Inc., Bristol, CT (US)

( * ) Notice: Subject to any disclaimer, the term of this patent is extended or adjusted under 35 U.S.C. 154(b) by 91 days.

(21) Appl. No.: 11/299,846

(22) Filed: Dec. 12, 2005

(65) Prior Publication Data
US 2006/0091593 A1    May 4, 2006

Related U.S. Application Data

(62) Division of application No. 10/058,188, filed on Jan. 29, 2002, now Pat. No. 7,000,908.

(51) Int. Cl.
*F16F 1/00* (2006.01)
*F16F 9/00* (2006.01)

(52) U.S. Cl. .............................. 267/69; 267/70; 267/73

(58) Field of Classification Search .............. 267/4, 197, 267/199, 69, 70, 71, 73, 74, 293
See application file for complete search history.

(56) References Cited

U.S. PATENT DOCUMENTS

| | | | |
|---|---|---|---|
| 1,135,372 A * | 4/1915 | Gibson | 267/71 |
| 1,329,561 A | 2/1920 | Thompson | |
| 1,385,919 A | 7/1921 | Irwin | |
| 1,517,138 A | 11/1924 | Wike | |
| 1,779,683 A | 10/1930 | Cowell | |
| 2,063,967 A * | 12/1936 | Whittam | 215/307 |
| 2,948,529 A | 8/1960 | Maier | |
| 2,953,335 A * | 9/1960 | Kiekhaefer | 248/567 |
| 3,131,921 A | 5/1964 | Karbowniczek | |
| 3,575,404 A * | 4/1971 | Wesch | 267/74 |
| 3,977,712 A | 8/1976 | Northrop | |
| 4,025,011 A * | 5/1977 | Rapps | 248/561 |
| 4,057,235 A | 11/1977 | Halopoff | |
| RE29,545 E | 2/1978 | Deisenroth | |
| 4,118,020 A | 10/1978 | Myers | |
| 4,509,473 A | 4/1985 | Hamparian | |
| 4,634,088 A | 1/1987 | Schad | |
| 4,651,979 A | 3/1987 | Freitag | |
| 4,693,343 A | 9/1987 | Boyd | |
| 4,757,853 A * | 7/1988 | Price | 160/191 |
| 4,962,916 A | 10/1990 | Palinkas | |
| 4,992,629 A * | 2/1991 | Morais | 174/69 |
| 5,014,004 A | 5/1991 | Kreibich | |
| 5,120,030 A | 6/1992 | Lin et al. | |
| 5,291,974 A | 3/1994 | Bianchi | |
| 5,307,753 A * | 5/1994 | Besonen et al. | 114/230.18 |

(Continued)

FOREIGN PATENT DOCUMENTS

| | | |
|---|---|---|
| DE | 2461838 | 6/1976 |
| DE | 2722884 | 11/1978 |

(Continued)

*Primary Examiner* — Melody Burch
(74) *Attorney, Agent, or Firm* — Fay Sharpe LLP; Brian E. Turung; James E. Scarbrough (57) ABSTRACT

A counterbalance for use in a motor vehicle that is connected to a tailgate to at least partially control the movement of the tailgate. The counterbalance is made of a spring that counters the load applied to the tailgate, a flexible material strap that provides a stop for the counterbalance, a protective housing that covers the spring, and a flexible material strap. The counterbalance has a fully extended length that is greater than twice the length of the counterbalance when non-extended.

8 Claims, 7 Drawing Sheets

U.S. PATENT DOCUMENTS

| | | | |
|---|---|---|---|
| 5,336,199 A * | 8/1994 | Castillo et al. | 604/198 |
| 5,360,123 A | 11/1994 | Johnston | |
| 5,375,823 A | 12/1994 | Navas | |
| 5,482,258 A * | 1/1996 | Clauson et al. | 267/71 |
| 5,482,261 A | 1/1996 | Ortega | |
| 5,511,868 A | 4/1996 | Eftefield | |
| 571,972 A | 11/1996 | Janney | |
| 5,607,035 A * | 3/1997 | Fulks et al. | 188/322.19 |
| 5,620,066 A | 4/1997 | Schuttler | |
| 5,728,174 A | 3/1998 | Fitzlaff | |
| 5,810,339 A * | 9/1998 | Kuspert et al. | 267/293 |
| 5,832,861 A * | 11/1998 | Taylor | 114/230.26 |
| 5,887,857 A | 3/1999 | Perrin | |
| 5,946,946 A | 9/1999 | Sharp | |
| 5,984,058 A | 11/1999 | Danneker | |
| 6,026,755 A | 2/2000 | Long | |
| 6,098,970 A * | 8/2000 | Lowe | 267/179 |
| 6,179,099 B1 | 1/2001 | Koch | |
| 6,196,609 B1 * | 3/2001 | Bowers | 296/57.1 |
| 6,199,843 B1 | 3/2001 | DeGrace | |
| 6,673,002 B2 | 1/2004 | Trovinger et al. | |
| 6,773,003 B2 | 8/2004 | Dermody, Jr. | |
| 2002/0027050 A1 * | 3/2002 | Takakusaki | 188/321.11 |
| 2002/0190446 A1 * | 12/2002 | Bush | 267/73 |
| 2009/0275816 A1 * | 11/2009 | Planman et al. | 600/365 |

FOREIGN PATENT DOCUMENTS

| | | |
|---|---|---|
| DE | 2722884 A1 | 6/1980 |
| DE | 3716205 A1 | 11/1987 |
| DE | 393 9118 | 5/1991 |
| DE | 3939118 C2 | 5/1991 |
| DE | 3716205 C2 | 2/1993 |
| DE | 19 504961 | 8/1996 |
| DE | 200 00940 | 5/2000 |
| GB | 381984 | 10/1932 |
| GB | 2036247 A | 6/1980 |
| JP | 5 705934 | 1/1982 |

* cited by examiner

TAILGATE STABILIZER

This application is a divisional of U.S. Pat. No. 7,000,908, which was filed as U.S. patent application Ser. No. 10/058,188 on Jan. 29, 2002, the disclosure of which is incorporated herein by reference.

The present invention relates to a counterbalance for an access in a motor vehicle, and more particularly to a counterbalance for a tailgate of a motor vehicle.

BACKGROUND OF THE INVENTION

Doors, tailgates, hoods, and the like that have a substantial weight and which open and close by use of a hinge or similar arrangement are typically counterbalanced by use of a spring. In several common arrangements, the spring is used to counterbalance the forces associated with the opening and closing of doors, tailgates, hoods, and the like, and to further reduce the force needed to open and close the doors, tailgates, hoods, and the like.

Tailgates and hoods are commonly mounted to vehicles by use of a hinge and pivot between an opened and closed position to grant access to a cargo area or engine compartment. In the past, chains, cables or articulated brackets have been used to limit the opening of the tailgate. However, devices do not provide any counterbalancing force to facilitate in the opening and closing of the tailgate. Gas springs or struts have been used in the past to assist in opening and/or closing tailgates and hoods. However, such gas springs or struts are problematic when used with tailgates that are subjected to loads when the tailgate is in an opened position. The gas springs or struts may not withstand such loadings, especially when the vehicle is being operated. In addition, gas springs and struts are affected by ambient temperatures. As such, when the temperature changes, the forces applied by the gas springs or struts also changes. The change in forces can result in difficulty in opening and/or closing the hood or tailgate, or can result in damage to the tailgate or hood when opening or closing the tailgate or hood.

Elastic elements such as springs are also commonly used to provide counterbalancing forces during the opening and closing of the doors, hoods and tailgates. When such springs are used with doors and tailgates, the spring can be damaged when the door is opened too wide, and when large loads are exerted on the tailgate in an opened position. Extension springs are designed to provide a certain load and/or deflection, thus assigning a certain rate to the spring. As a result, the amount of travel of the spring is controlled by the rating of the spring. Extension springs are typically comprised of round wire that is tightly coiled or pitched (open coils). These springs have a maximum extension point. Exceeding such a maximum extension point results in damage to the springs. As a result, the springs cannot provide a solid stop, nor can the springs handle or be exposed to large loads in their extended state. Another elastic element that is sometimes used is a rubber band or bungee cord. However, as with extension springs, rubber bands or bungee cords cannot provide a solid stop, nor can the rubber bands or bungee cords handle or be exposed to large loads in their extended state.

Several arrangements have been developed to minimize the damage to springs resulting in over extension of the spring. One such arrangement is disclosed in U.S. Pat. No. 5,810,339. In this arrangement, two draw yokes are used to minimize over extension of the spring. However, the yoke assembly limits the travel of the assembly to no more than double the length of the assembly in a non-extended state. Other types of solid stop arrangements that include stiff, high-strength materials (e.g. metals) limit the travel of the counterbalance assembly by imposing a stop that is no more that double the length of the assembly in a non-extended state. If travel of the assembly is to be more than twice the length of the non-extended assembly, these existing solid stops cannot be used.

In view of the state of the art of assemblies used in association with doors, hoods and tailgates of a vehicle, there is a need for an assembly that provides counterbalancing forces to facilitate in the opening and/or closing of doors, hoods and tailgates, and which provides a solid stop to prevent over extension of the elastic material in the assembly without necessarily limiting the extension of the assembly to only twice the length of the non-extended assembly.

SUMMARY OF THE INVENTION

The present invention pertains to a tailgate counterbalance assembly which overcomes the past deficiencies of such assemblies. Although the present invention will be described with particular reference to a tailgate counterbalance assembly, the invention has much broader applications and pertains to counterbalance assemblies wherein there is an advantage to have a solid stop to prevent over extension of the elastic element in the counterbalance assembly.

In accordance with the principal feature of the present invention, there is provided a tailgate counterbalance assembly that includes an elastic element, expansion limiter, and a protective housing. In one embodiment, the elastic element includes structures that have elastic characteristics. In one aspect of this embodiment, the elastic element, includes, but is not limited to, springs, elastic rubber, a bungee cord, and the like. In one specific design, the elastic element is a metal spring. In another aspect of this embodiment, the counterbalance assembly includes a single elastic element. In still another aspect of this embodiment, the counterbalance assembly includes multiple elastic elements. When multiple elastic elements are used, the elastic elements can be the same type or different types, and/or the elastic elements can be the same size and/or configuration or have different sizes and/or configurations. In another embodiment, the expansion limiter is a flexible, high strength material that is able to provide a solid stop to the further extension of the elastic element. In one aspect of this embodiment, the expansion limiter includes, but is not limited to, metal and/or material cords, metal and/or material webbing, metal and/or material chains, and the like. In another aspect of this embodiment, the counterbalance assembly includes a single expansion limiter. In still another aspect of this embodiment, the counterbalance assembly includes multiple expansion limiters. When multiple expansion limiters are used, the expansion limiters can be the same type or be of different types, and/or the expansion limiters can be the same size and/or configuration or have different sizes and/or configurations. In still another embodiment, the protective housing is an expandable housing that at least partially accommodates the extension of the elastic element. In one aspect of this embodiment, the protective housing at least partially houses the elastic element. In another aspect of this embodiment, the protective housing at least partially houses the expansion limiter.

In accordance with another aspect of the present invention, the elastic element is an extension spring having a certain spring rate. The spring rate is equal to the load applied to the spring divided by the amount of deflection of the spring. The amount of control an operator has in opening and/or closing a door, tailgate and the like that is at least partially counterbalanced by the counterbalance assembly is at least partially determined by the rate of the spring. For instance, when the spring rate is increased, the operator will have greater control over the lowering of a tailgate of a vehicle; however, if the spring rate is too high, the operator may not be able to cause the tailgate to lower. When the spring rate is decreased, the counter balancing effect provided by the spring may be severely reduced thereby increasing the difficulty in lowering and rasing the tailgate. Furthermore, too low of a spring rate can also result in the spring being damaged by large loads. As a result, proper selection of the spring rate for a particular application of the counterbalance assembly is important.

In accordance with still another aspect of the present invention, one end of the expansion limiter runs along the one end of the elastic element or a connector attached to one end of the elastic element. In one embodiment, the expansion limiter includes a first and second end whereby the second end runs along the one end of the elastic element or a connector attached to one end of the elastic element, and the first end of the expansion limiter remains stationary to or runs along the other end of the elastic element or a connector attached to the other end of the elastic element. In another embodiment, at least one end of the expansion limiter is connected to at least one end of the elastic element or a connector attached to one end of the elastic element. In one aspect of this embodiment, the end of the expansion limiter is connected to the end of the elastic element or connector on the end of the elastic element by a mounting arrangement that includes, but is not limited to, a pin, a loop, a knot, a clip, a hook, or the like. In still another embodiment, the length of the expansion limiter is selected to control the maximum extension of the elastic member and/or the counterbalance assembly. In one aspect of this embodiment, the expansion limiter limits the expansion of the counterbalance assembly to no more than twice the length of the counterbalance assembly in a non-extended state. In another aspect of this embodiment, the expansion limiter allows the counterbalance assembly to expand beyond twice the length of the counterbalance assembly in a non-extended state. In still yet another embodiment, the length of the expansion limiter can be any number of structures such as, but not limited to, a band, belt, cable, chain, cord, strap, and/or web.

In accordance with yet another aspect of the present invention, at least a portion of the expansion limiter is gathered in the body of the elastic element. In one embodiment, the elastic element includes a spring wherein the coils of the spring extend along the longitudinal length of the spring and form a cavity for at least a portion of the expansion limiter to gather therein. In one aspect of this embodiment, a majority of the expansion limiter is gathered in the body of the spring during the expansion and contraction of the spring. The length of the legs of the spring can be adjusted to dictate the amount of expansion limiter that is gathered in the body of the spring.

In accordance with yet another aspect of the present invention, the protective housing includes a plurality of components wherein at least one component telescopically receives a portion of another component. In one embodiment, a majority of the expansion limiter is housed in at least one of said components when said counterbalance assembly is in an expanded and non-expanded state. In another embodiment, a majority of the elastic element limiter is housed in at least one of said components when said counterbalance assembly is in an expanded and non-expanded state. In yet another embodiment, the protective housing includes three or more components. In still another embodiment, at least one component of the protective housing is a substantially tubular component. In one aspect of this embodiment, all the components of the protective housing are substantially tubular components. In still yet another embodiment, at least one end of one of said components includes a connector opening to at least partially secure one end of said elastic element and/or expansion limiter.

It is the principal object of the present invention to provide a counterbalance assembly that includes a solid stop.

It is another and/or alternative object of the present invention to provide a counterbalance assembly that prevents over expansion and/or damage to an elastic element in the counterbalance assembly.

It is still another and/or alternative object of the present invention to provide a counterbalance assembly that allows the counterbalance to extend more or less than twice the length of the non-extended counterbalance assembly while still providing a solid stop.

It is yet another and/or alternative object of the present invention to provide a counterbalance assembly that includes a flexible extension limiter.

It is still yet another and/or alternative object of the present invention to provide a counterbalance assembly that includes a flexible extension limiter that can support loads that are greater than loads that could be supported by the elastic element without damaging the elastic element.

It is a further and/or alternative object of the present invention to provide a counterbalance assembly that includes a protective housing that at least partially protects the elastic element and/or extension limiter.

It is still a further and/or alternative object of the present invention to provide a counterbalance assembly that includes a protective housing that extends more than twice the length of the non-extended counterbalance assembly.

It is yet a further and/or alternative object of the present invention to provide a counterbalance assembly that can be used to counterbalance the weight of a tailgate of a vehicle.

These and other objects of the invention will become apparent to those skilled in the art upon reading and understanding the following detailed description of preferred embodiments taken together with the drawings.

BRIEF DESCRIPTION OF THE DRAWINGS

The invention may take physical form in certain parts and arrangement of parts, preferred embodiments of which will be described in detail and illustrated in the accompanying drawings which form a part hereof and wherein.

Advantageous embodiments of the invention are evident from the following description.

The invention is explained in the following with reference to the drawing figures, in which.

DETAILED DESCRIPTION OF EMBODIMENTS

Figure 1:
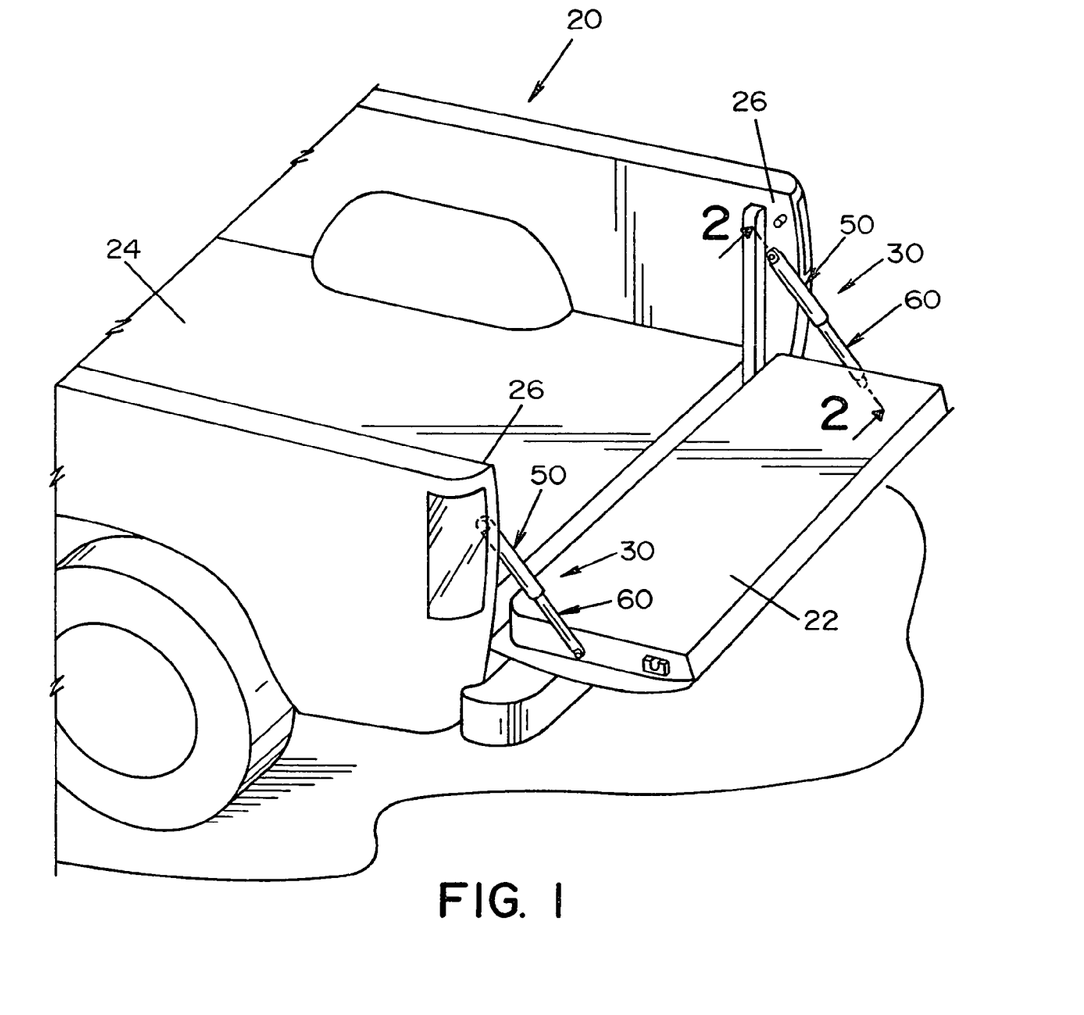
FIG. 1 illustrates a tail part of a motor vehicle having a tailgate which is pivotable about a horizontal axis and including the counterbalance assembly of the present invention.

Referring to the drawings, wherein the showings are for the purpose of illustrating the preferred embodiment of the invention only and not for the purpose of limiting same, FIG. 1, illustrates the tailgate 22 of truck 20. The tailgate pivots about the end of the cargo area of the truck between an opened and closed position. The tailgate is illustrated as being in the opened position in FIG. 1 to provide access to the cargo area 24 of the truck. The tailgate is connected to the truck in a convention manner, thus no further details will be provided concerning the pivotable connection of the tailgate about a respective horizontal axis to the truck. As can be appreciated, the tailgate can be connected to other types of vehicles such as station wagons, SUV's, mini- and full-sized vans, and the like.

Connected to each side of the tailgate is a counterbalance assembly 30. One end of the counterbalance assembly is connected to a portion of the tailgate and the other end of the counterbalance assembly is connected to the side walls of the cargo area. The ends of the counterbalance assembly can be connected to the tailgate and side wall of the cargo area in a variety of ways. The connection is generally a pivotal connection to allow the ends of the counterbalance assembly to rotate or otherwise move relative to the side wall and/or tailgate as the tailgate is opened and closed. A wide variety of connections can be used. One particular connection that can be used involves the use of a pin connection. As can be appreciated, the counterbalance assembly can be connected to other parts of a vehicle such as, but not limited to the doors, the hood, rear upper hatches, and the like. The operation and advantage of using the counterbalance assembly on these other parts of the vehicle are similar to the operation and advantage of the counterbalance assembly when used with a tailgate.

Referring now to FIGS. 2-6, counterbalance assembly 30 includes a protective housing 40 formed by two tubes 50, 60. The protective housing is designed to at least partially protect the components of the counterbalance assembly located inside the protective housing from damage, dirt and other debris, and/or from the ambient elements. The protective housing is also designed to pack the components of the counterbalance assembly located inside the protective housing in a limited area. The protective housing is not designed to provide the principal or primary structural support to the counterbalance assembly for given load conditions; however, the protective housing can be designed to provide some structural support if such support is desired. The materials of the protective housing are not limiting and can include, but are not limited to, plastic, rubber, metal, fiberglass, ceramic, polymer resins, fiber reinforced materials, etc.

Figure 4:
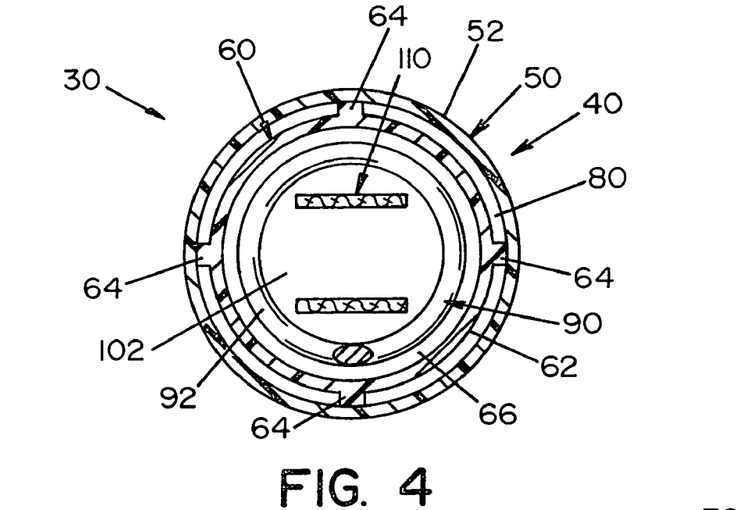
FIG. 4 is a cross-sectional view of a counterbalance assembly along line 4-4 of FIG. 2.
Figure 6:
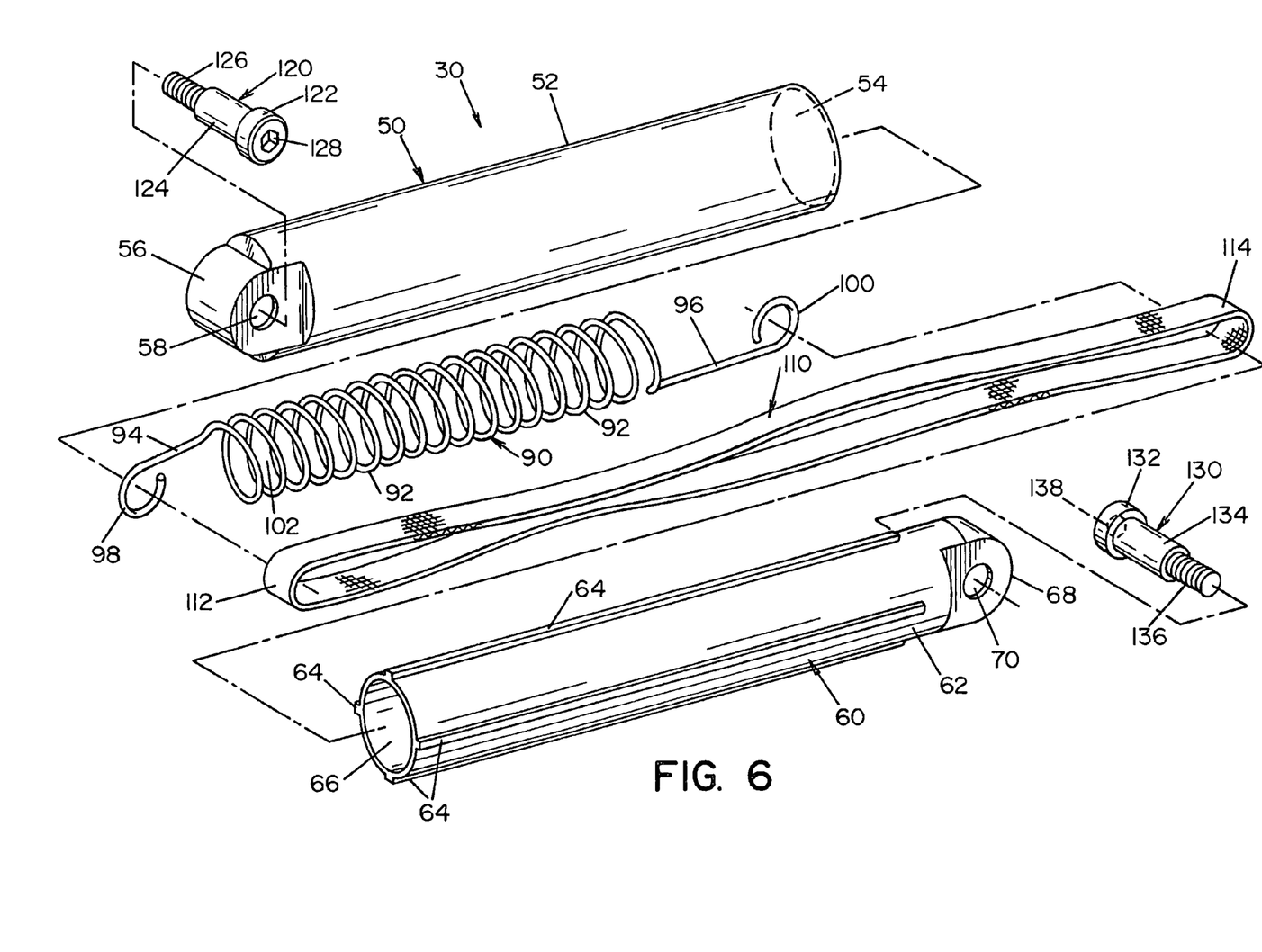
FIG. 6 is an exploded view of the counterbalance assembly of FIG. 1.

Tube 50 has a larger diameter than tube 60 to enable tube 50 to telescopically receive a portion of tube 60. The outer surface 52 of tube 50 is substantially smooth; however, this is not required. The inner chamber 54 of tube 50 has a substantially uniform circular cross-section shape; however, other uniform or non-uniform cross-section shapes can be used. The inner surface of inner chamber 54 is substantially smooth; however, this is not required. The end 56 of tube 50 includes an opening 58. The opening is designed to allow a mounting pin 120 to be inserted therethrough as will be described in detail below. Tube 60 has a similar configuration as tube 50. Tube 60 includes an outer surface 62 that includes a plurality of ribs 64. As best shown in FIG. 6, the ribs extend at least partially along the longitudinal axis of tube 60. As best shown in FIG. 4, the ribs are designed to create a gap 80 between the outer surface of tube 60 and the inner surface of the inner chamber of tube 50 so as to facilitate in the substantially free movement of tube 60 at least partially into the inner chamber of tube 50. As shown in FIG. 6, tube 60 includes four symmetrically spaced ribs. As can be appreciated, a greater or lesser number of ribs can be used. Furthermore, two or more ribs can be non-symmetrically oriented on the outer surface 62 of tube 60. Tube 60 also includes an inner chamber 66 and an end 68 which includes an opening 70. Inner chamber 66, like inner chamber 54, has a substantially smooth inner surface; however, this is not required. Furthermore, inner chamber 66 has a substantially uniform circular cross-section shape; however, other uniform or non-uniform cross-section shapes can be used. Opening 70 is designed to allow a mounting pin 130 to be inserted therethrough as will be described in detail below.

Positioned in the inner chambers of tubes 50, 60 is an elastic element in the form of spring 90. Spring 90 includes a plurality of coils 92 and two legs 94, 96. Formed at the end of each of the legs is a loop 96, 98. The coils of the spring form a substantially cylindrical chamber 102 along the longitudinal length of the coils. Spring 90 has a particular spring rate based upon the load range the counterbalance is to be exposed. The number of coils in the spring and the length of the legs of the spring are selected depending on the amount of extension desired for the counterbalance assembly and the desired length of the counterbalance assembly. Although not shown, the spring design can take on other configurations such as, but not limited to, inserting one or more legs between two or more coils of the spring. The spring can be made of a number of materials depending on several factors such as, but not limited to, the loads to be exerted on the spring, the environment the spring is to be used in, the size and/or weight of the spring to be used, etc. Typically, the spring is made of metal.

Figure 2:
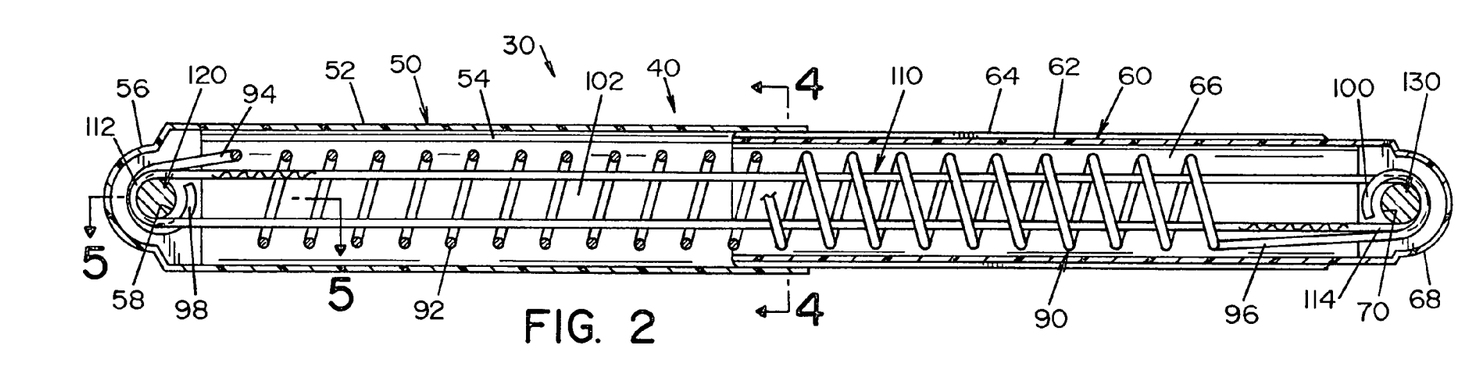
FIG. 2 is an enlarged cross-sectional view of a counterbalance assembly of the present invention along line 2-2 of FIG. 1 showing the counterbalance assembly in an extended position.
Figure 3:
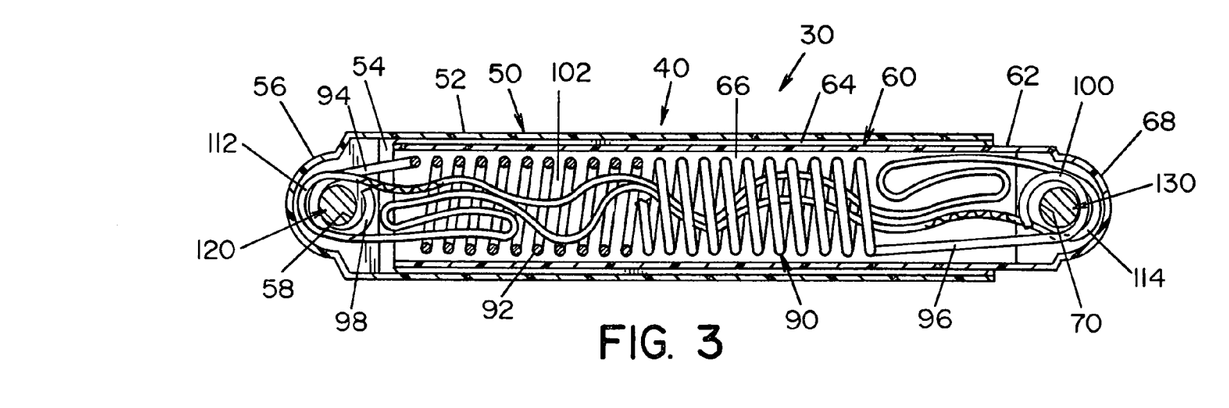
FIG. 3 is a cross-sectional view of a counterbalance assembly of FIG. 2 showing the counterbalance assembly in a non-extended position.

Also positioned in the inner chambers of tubes 50, 60 is a flexible extension limiter in the form of a material strap 110. The strap is shown as being a loop of material that has been connected at its two ends 112, 114. The strap is designed to handle the load applied by the tailgate to the counterbalance assembly when the counterbalance assembly is in the fully extended position. Furthermore, the strap is designed to provide a stop once the counterbalance has fully extended as shown in FIG. 2. The strap can be made of a number of materials. Typically, the strap is made of a nylon or nylon/kevlar blend. As can be appreciated, the flexible extension member can have other configurations. For instance, the flexible extension member could be a single cord or strap having a loop or other connector positioned at each end of the cord or strap. Alternatively, the flexible extension member could be a single cord or strap that has its ends connected to one or more other components of the counterbalance assembly.

Figure 5:
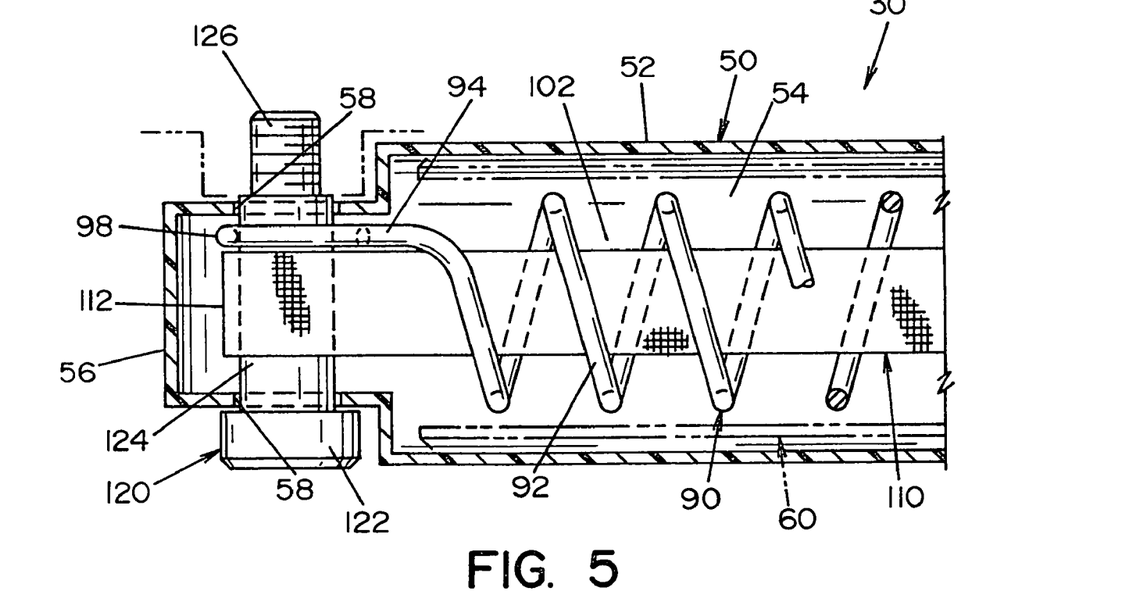
FIG. 5 is an enlarged cross-sectional view of one end of the counterbalance assembly.

Referring to FIG. 6, mounting pins 120, 130 are shown to include a head 122, 132, a body 124, 134 and a threaded end 126, 136. The head of the mounting pins is shown to include a slot 128, 138 that allows a tool to insert and/or turn the mounting pin. The mounting pins are designed to secure the ends of the spring and the strap to the ends of tubes 50, 60. Referring now to FIG. 5, mounting pin 120 is inserted through opening 58 of tube 50. Head 122 is sized and/or shaped so as to prevent the head from passing through opening 58. The body of the mounting pin is typically sized so as to be the same size and shape of the opening or slightly less than the size and shape of the opening to allow the body to pass through the opening, yet restrict the amount of movement in the opening. As can be appreciated, the size and shape of the body of the mounting pin can substantially deviate from the size and shape of the opening so long as at least a portion of the body can pass through the opening. The body of the mounting pin is shown as passing through loop 98 of spring 90 and through the looped end 112 of strap 110 so as to secure one end of the spring and strap to the end of tube 50. The body of the mounting pin is illustrated as being smooth in this region so as not to cause undue ware on the loop of the spring and the end of the strap. As can be appreciated, the body of the mounting pin can have rough surfaces to better engage the end of the spring and/or strap if such added engagement is desired. The threaded end of the mounting pin is designed to be threaded into a connector located on the side wall of the cargo area. Similarly, mounting pin 130 is inserted through opening 70 of tube 60. Head 132 is sized and/or shaped so as to prevent the head from passing through opening 70. The body of the mounting pin is shown as passing through loop 100 of spring 90 and through the looped end 114 of strap 110 so as to secure one end of the spring and strap to the end of tube 60. The threaded end of the mounting pin is designed to be threaded into a connector located on the side of the tailgate.

The operation of the counterbalance shown in FIGS. 1-6 will now be described. When a load is applied to the tailgate to cause the tailgate to move to the opened position, the load is at least partially directed to the spring in the counterbalance assembly. The spring rate of the spring controls the rate at which the tailgate travels about the horizontal axis. The spring rate is selected to allow the operator to lower the tailgate with ease until the tailgate reaches its lowest point (i.e. fully opened position). This point may be a fully horizontal position, slightly tilted upwards or downwards from the fully horizontal position, etc. When the tailgate is at its lowest position, the load is at least partially transferred from the spring to the flexible strap since the strap is now in a fully extended position. Any further load applied downwardly on the tailgate is fully carried by the strap. The especially non-extendable strap substantially prevents further extension of the counterbalance assembly or the spring. The load applied to the tailgate at its lowest position can be substantially greater than the load applied by the tailgate itself due to the weight of the tailgate. For instance, the tailgate may be used as a sitting area, an extension of the cargo area for hauling materials and the like. During such use of the tailgate, added loads are applied to the tailgate. The strap is designed to support these additional loads while substantially preventing further extension of the counterbalance assembly or the spring. When the tailgate is lifted to its closed position, the spring once again carries at least a portion of the load due to the weight of the tailgate. The strap merely retracts or bundles up in the interior of the counterbalance assembly. The spring rate of the spring assists the operator in moving the tailgate to the closed position. When the tailgate is moved to the closed position, the counterbalance is moved to its non-extended position or close to its non-extended position. In this position, there may be little or no loading being applied to the spring. This procedure of opening and closing the tailgate with the assistance of the one or more counterbalance assemblies can be repeated many times with any substantial change in the appearance of the counterbalance assembly or any substantial change in the performance of the counterbalance assembly.

Figure 7:
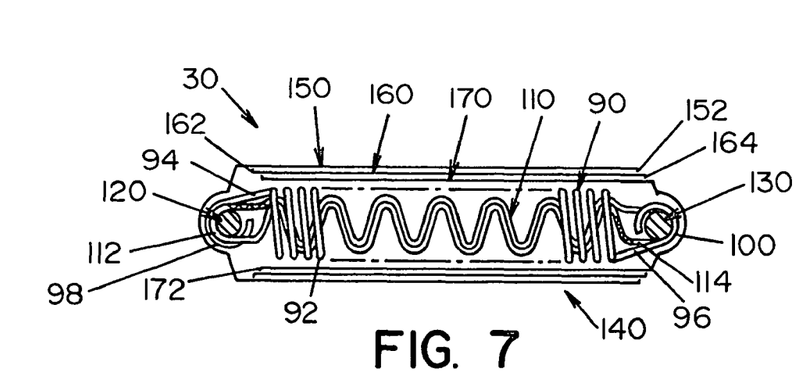
FIG. 7 is a cross-sectional view of another embodiment of the counterbalance assembly of the present invention along the longitudinal axis of the counterbalance assembly while the counterbalance assembly is in a non-extended position.
Figure 8:
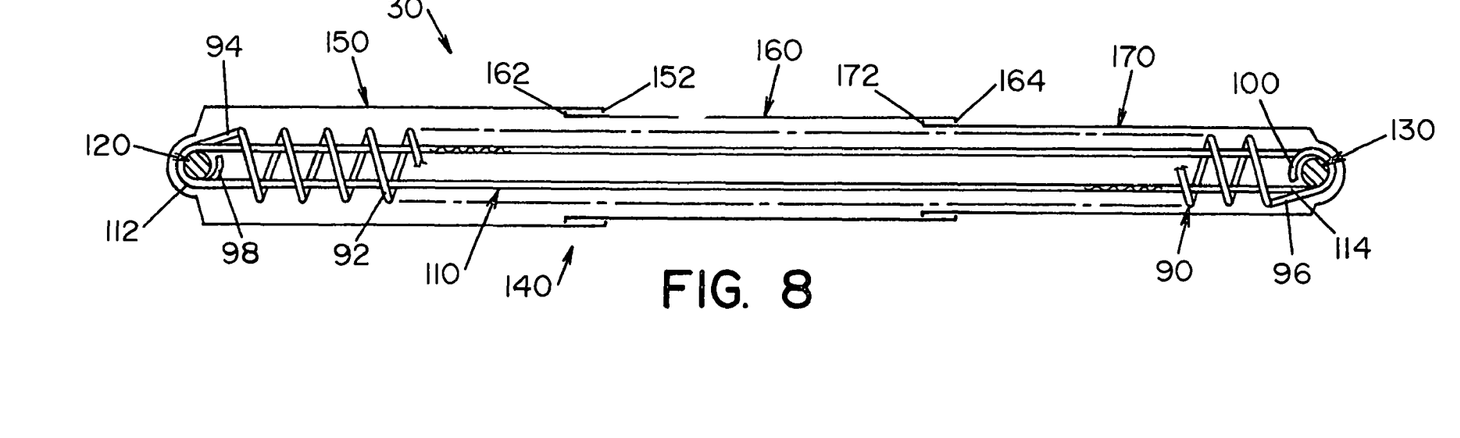
FIG. 8 is a cross-sectional view of another embodiment of the counterbalance assembly of the present invention along the longitudinal axis of the counterbalance assembly while the counterbalance assembly is in an extended position.

Referring now to FIGS. 7 and 8, a modification of the design of the counterbalance of FIGS. 1-6 is shown. The counterbalance of FIGS. 1-6 pertain to a counterbalance design that can extend no more than twice the length of the counterbalance in the non-extended state. When the counterbalance needs to extend more than twice the length of the counterbalance in the non-extended state, the protective housing must be modified, and the length of the strap must be adjusted. As shown in FIG. 7, the protective housing 140 includes three tubes 150, 160, 170. As can be appreciated, additional tubes can be used. Although not shown, a single stretchable and/or corrugated plastic or rubber sleeve could be used in combination with one or more tubes or be used as an alternative to the multiple tubes. Tubes 150 and 170 have similar configurations and functions as tubes 50 and 60, respectively. In addition, mounting pins 120, 130 connect spring 90 and strap 110 to the ends of tubes 150 and 170 in a manner similar to the attachment onto tubes 50 and 60. The opened ends of tubes 150 and 170 include retainers 152, 172 to prevent tube 160 from disengaging from tubes 150 and 170. In addition, tube 160 includes retainers 162, 164 at both ends to also facilitate in preventing tube 160 from disengaging from tubes 150 and 170. As shown in FIG. 8, the three tube designs enable the counterbalance to extend more than twice its non-extended length.

Figure 9:
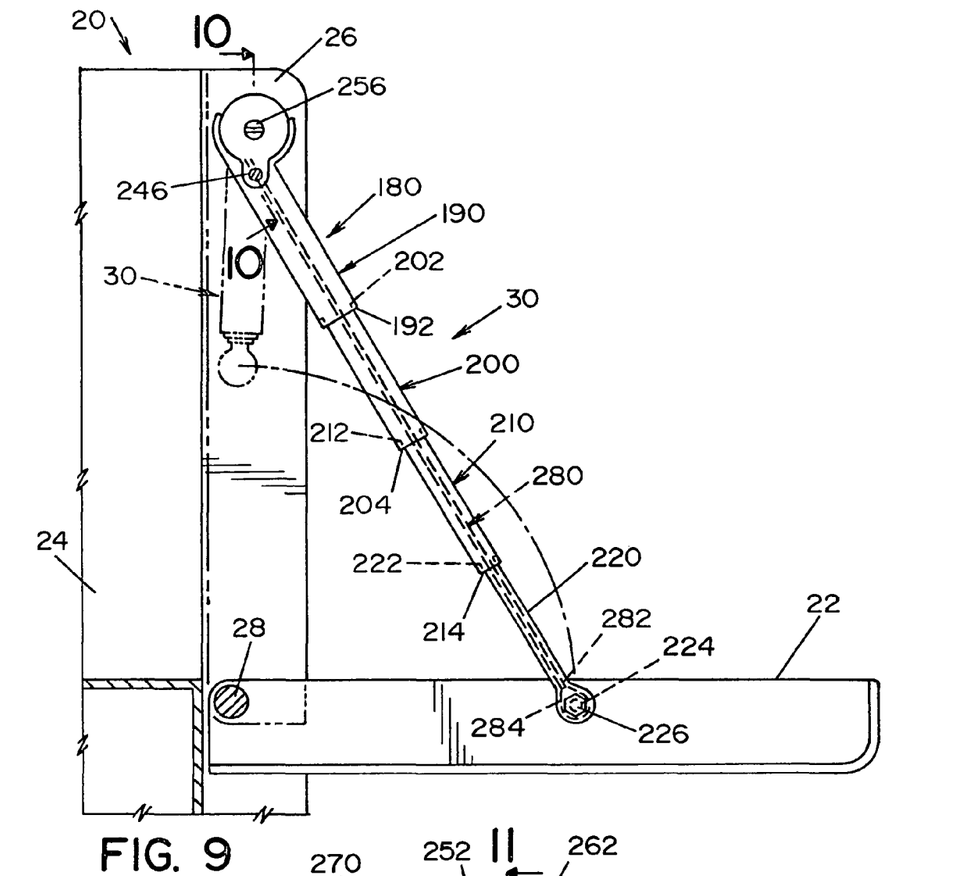
FIG. 9 illustrates another embodiment of the counterbalance assembly connected to the tailgate of a vehicle.
Figure 10:
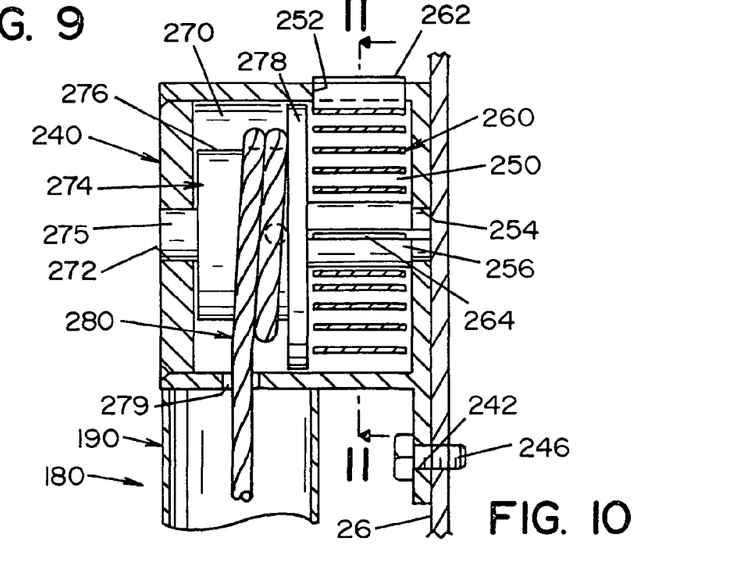
FIG. 10 is an enlarged cross-sectional view of the counterbalance assembly along lines 10-10 of FIG. 9.
Figure 11:
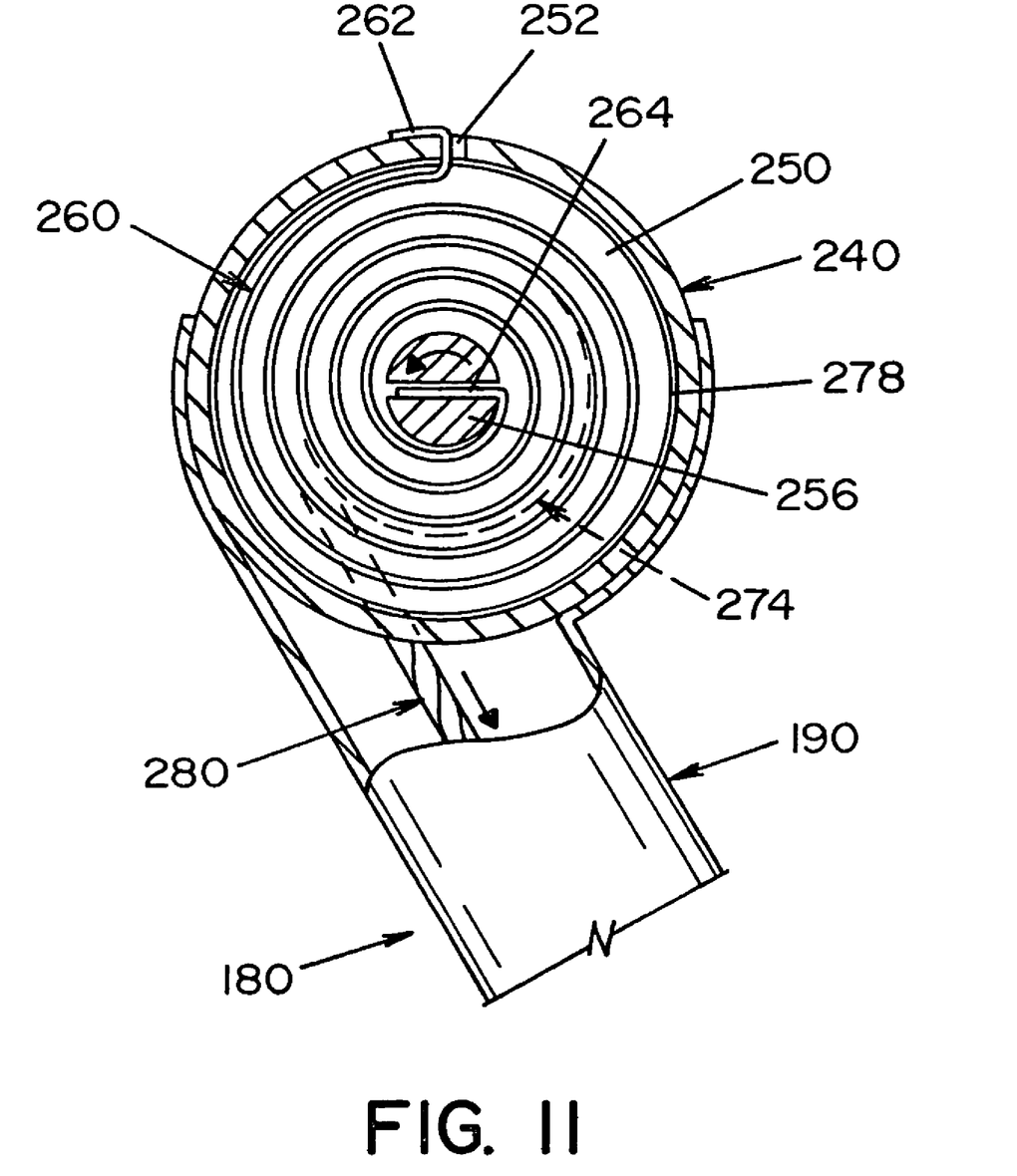
FIG. 11 is a cross-sectional view of the counterbalance assembly along lines 11-11 of FIG. 10.

Referring now to FIGS. 9-11, another alternative embodiment of the counterbalance is illustrated. In this embodiment, a coiled spring 260 is used instead of a pitched spring, and a single cord 280 is used instead of a strap. As shown in FIG. 9, coiled spring 260 and spring housing 240 along with a portion of the protective housing 180 of the counterbalance assembly 30 is mounted to the side wall 26 of the cargo area 24 of truck 20. One end 282 of cord 280 is connected to the side of tailgate 22. Tailgate 22 is pivotably mounted to the base of cargo area 24 by a pivot pin 28. As can be appreciated, the manner in which the counterbalance assembly is mounted to the side wall of the cargo area and the tailgate can be reversed.

Protective housing 180 is shown to include four tubes 190, 200, 210, 220. The design and function of tubes 200 and 210 is similar to tube 160 illustrated in FIGS. 7 and 8. As can be appreciated, one or more of the tubes can be substituted by a single stretchable and/or corrugated plastic or rubber sleeve. Tubes 190, 200, 210, and 220 include retainers 192, 202, 204, 212, 214, 222 that are used to prevent the tubes from disengaging from one another. Tubes 190 and 200 are shaped and sized so that tube 190 can at least partially telescopically receive tube 200. Tubes 200 and 210 are shaped and sized so that tube 200 can at least partially telescopically receive tube 210. Tubes 210 and 220 are shaped and sized so that tube 210 can at least partially telescopically receive tube 220. The mounting end of tube 220 includes an opening 224 that is designed to receive a mounting bolt 226. The mounting bolt secures the end of tube 220 and end 282 of cord 280 to the side of tailgate 22. FIG. 9 illustrates the counterbalance assembly in the fully extended position while the tailgate is in its opened position. A dashed line representation of the counterbalance assembly is also shown in FIG. 9 to represent the counterbalance assembly in the non-extended position when the tailgate is in the closed position.

Referring now to FIGS. 10 and 11, the spring housing 240 and the coil spring is shown. The spring housing includes a spring chamber 250 and a cord chamber 270. The spring housing also includes at least one mount opening 242 to allow the spring housing to be mounted by mount bolts 246 to the side wall 26 of the cargo area. As shown in FIG. 11, a portion of the end of tube 190 encompasses the spring housing. As can be appreciated, the end of tube 190 can be designed to fully encompass the spring housing or not encompass any portion of the spring housing.

The spring chamber 250 is designed to house the coil spring 260. Spring chamber 250 includes a slot 252 to engage the outer end 262 of the coil spring. Spring chamber 250 also includes a center mount 254 to receive a center flange 256. The center flange is mounted to the inner end 264 of the coil spring. The coil spring has a spring rate selected for the type of load to be exerted on the counterbalance assembly.

Cord chamber 270 is designed to house cord 280. The cord chamber includes a circular side opening 272 which receives a spool end 275 of spool 274. Spool 274 also includes a spool body 276 and a spool head 278. The spool body 276 has a size and shape to allow cord 280 to be fully coiled on the body when the counterbalance assembly in the non-extended position. The spool head has a diameter that is the same as or slightly less than the diameter of the cord chamber. The spool head functions as a divider between the cord chamber and the spring chamber. The spool end 275 in conjunction with the spool head 278 maintain the spool in proper alignment in the cord chamber while the spool rotates in the cord chamber. Cord chamber 270 also includes a cord opening 279 to allow cord 280 to pass from the cord chamber and through the tubes of the protective housing. The body of spool 274 includes a connector to connect one end of the cord to the spool. The other end of the cord 282 is connected to a loop bracket 284 which in turn is connected by mount bolt 226, as shown in FIG. 9. As can be appreciated, the end of the cord can be connected to mount bolt 226 in a variety of other ways.

In operation, the coil spring facilitates in the opening and closing of the tailgate in a manner similar to spring 90 of FIGS. 1-8. Cord 280 has a length that defines the fully extended length of the counterbalance assembly. The spring rate of the coil controls the rate at which the tailgate travels about the horizontal axis. The spring rate is selected to allow the operator to lower the tailgate with ease until the tailgate reaches its lowest point (i.e. fully opened position). When the tailgate is at its lowest position, the load is at least partially transferred from the spring to the flexible strap since the strap is now in a fully extended position. Any further load applied downwardly on the tailgate is fully carried by the strap. The non-extendable strap substantially prevents further extension of the counterbalance assembly. The load applied to the tailgate at its lowest position can be substantially greater than the load applied by the tailgate itself due to the weight of the tailgate. The cord is designed to support the tailgate and any additional loads applied to the tailgate while substantially preventing further extension of the counterbalance assembly. When the tailgate is lifted to its closed position, the coil spring once again carries at least a portion of the load due to the weight of the tailgate. The strap merely retracts or bundles up in the interior of the counterbalance assembly. The spring rate of the coil spring assists the operator in moving the tailgate to the closed position. When the tailgate is moved to the closed position, the counterbalance is moved to its non-extended position or close to its non-extended position. In this position, there may be little or no loading being applied to the coil spring. This procedure of opening and closing the tailgate with the assistance of the one or more counterbalance assemblies can be repeated many times with any substantial change in the appearance of the counterbalance assembly or any substantial change in the performance of the counterbalance assembly.

The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed is:

1. A counterbalance and aperture cover assembly for use in a motor vehicle to at least partially control the movement of the aperture cover comprising an elastic member that at least partially counters a load applied to said aperture cover, a flexible extension limiter comprising at least one strap that provides a stop which defines a fully extended position of said counterbalance and which counters said load applied to said aperture cover when said counterbalance is in a fully extended position, and a protective housing that at least partially covers said elastic member and said flexible extension limiter, said protective housing extendable to a length that is greater than twice the length of said protective housing in a non-extended position, and wherein said protective housing has mounting members, wherein said mounting members comprise pins extending through openings formed at opposite ends of said housing, wherein said pins comprise slotted openings for installing and rotating said pins; wherein said elastic member and said flexible extension limiter extend around said pins to connect said elastic member and said flexible extension limiter to said housing, wherein said protective housing includes first, second and third tubes wherein at least one of said first, second and third tubes has a retaining member to prevent said at least one of said first, second and third tubes from disengaging an adjacent one of said first, second and third tubes and wherein said at least one of said first, second and third tubes freely slides with respect to an adjacent one of said first, second and third tubes, and at least one of said first, second and third tubes has at least three symmetrically spaced apart ribs, wherein each of said ribs is substantially the same shape and size, wherein said ribs are formed on an outer wall of said at least one of said first, second and third tubes and are configured to provide a gap between said outer wall of said at least one of said first, second and third tubes and an inner wall of an adjacent one of said first, second and third tubes wherein said ribs are each formed of a single elongated member having a cross-sectional area which facilitates substantially free sliding movement between said one of said first, second and third tubes and said adjacent one of said first, second and third tubes; wherein an inner chamber of said at least one of said first, second and third tubes and an inner chamber of said adjacent one of said first, second and third tubes each has a substantially uniform cross-section.

2. The counterbalance as defined in claim 1, wherein said aperture cover is a tailgate that moves between a fully opened position when said counterbalance is in said fully extended position and a fully closed position when said counterbalance is in said non-extended position.

3. The counterbalance as defined in claim 2, wherein said elastic member includes a member selected from the group consisting of a coil spring, a pitched spring, rubber band, and bungee cord.

4. The counterbalance as defined in claim 1, wherein said elastic member includes a member selected from the group consisting of a coil spring, a pitched spring, rubber band, and bungee cord.

5. A counterbalance and aperture cover assembly for use in a motor vehicle to at least partially control the movement of the aperture cover comprising an elastic member that at least partially counters a load applied to said aperture cover, a flexible extension limiter comprising at least one strap that provides a stop which defines a fully extended position of said counterbalance and which counters said load applied to said aperture cover when said counterbalance is in a fully extended position, and a protective housing that at least partially covers said elastic member and said flexible extension limiter, said protective housing extendable to a length that is greater than twice the length of said protective housing in a non-extended position, wherein said protective housing includes at least a first and second tube wherein said second tube slides freely with respect to said first tube wherein said first tube and said second tube each comprises a retaining member at opposite ends of said first tube and said second tube to prevent said first tube from disengaging said second tube and four equally spaced longitudinally extending ribs, said ribs are of the same shape and size dimension, wherein said ribs are formed on an outer wall of said second tube to provide a gap between an inner wall of said first tube and said outer wall of said second tube, wherein said ribs are each formed from a single elongated member having a cross-sectional area which facilitates substantially free sliding movement of said second tube with respect to said first tube, wherein each of said first and second tubes has an inner chamber having a substantially uniform cross-section, said first tube having an opening that telescopically receives at least a portion of said second tube wherein said first tube comprises an opening for receiving a first mounting pin having a slotted opening therein and said second tube comprises an opening for receiving a second mounting pin having a slotted opening therein, wherein said flexible extension limiter and said elastic member extend around said first mounting pin and said second mounting pin to connect said elastic member and said flexible extension limiter to said first tube and said second tube.

6. The counterbalance as defined in claim 5, wherein said aperture cover is a tailgate that moves between a fully opened position when said counterbalance is in said fully extended position and a fully closed position when said counterbalance is in said non-extended position.

7. The counterbalance as defined in claim 5, wherein said elastic member includes a member selected from the group consisting of a coil spring, a pitched spring, rubber band, and bungee cord.

8. The counterbalance as defined in claim 5, wherein said flexible extension limiter includes a flexible structure selected from the group consisting of a band, belt, cable, chain, cord, strap, and web.

* * * * *